United States Patent

Wood

[15] 3,649,091
[45] Mar. 14, 1972

[54] METHOD AND APPARATUS FOR SECURING A ROLLING MILL TABLE BEARING

[72] Inventor: John Frederick Barry Wood, Burlington, Vt.

[73] Assignee: Dominion Engineering Works Limited, Montreal, Canada

[22] Filed: Feb. 18, 1970

[21] Appl. No.: 12,403

[30] Foreign Application Priority Data

Apr. 23, 1969 Canada ..................................49,483

[52] U.S. Cl. ..................................................308/15
[51] Int. Cl. ..................................................F16c 13/00
[58] Field of Search ........................................308/15

[56] References Cited

UNITED STATES PATENTS

| | | | |
|---|---|---|---|
| 1,663,582 | 3/1928 | Bonney | 308/68 |
| 1,746,129 | 2/1930 | Robinson, Jr. | 308/57 |

FOREIGN PATENTS OR APPLICATIONS

| | | | |
|---|---|---|---|
| 446,346 | 1/1948 | Canada | 308/54 |

*Primary Examiner*—Edgar W. Geoghegan
*Assistant Examiner*—Frank Susko
*Attorney*—Henry C. Westin

[57] ABSTRACT

The present disclosure relates to a method and apparatus for securing the bearing housing of a rolling mill table. The disclosure includes a bearing housing having a downwardly extending foot which is received in a recess of the table frame. Into the recess there is received a locking wedge for maintaining the housing in a positive locked engagement with the frame. In addition the housing is provided with short sided arms of great stiffness and strength, yet allowing the rolls of the table to be spaced close together.

4 Claims, 3 Drawing Figures

Patented March 14, 1972

INVENTOR.
J. F. BARRY WOOD

BY
HENRY C. WESTIN
HIS ATTORNEY

Patented March 14, 1972

INVENTOR.
J. F. BARRY WOOD
BY
HENRY C. WESTIN
HIS ATTORNEY

METHOD AND APPARATUS FOR SECURING A ROLLING MILL TABLE BEARING

This invention is directed to a method of securing a bearing housing; and a bearing mounting arrangement for carrying out the method. In particular, the bearing housing is for use with rolling mill tables.

In mounting the bearings of roll tables to withstand heavy working loads such as these experienced in rolling mills it has been prior practice to secure the housings of the bearing rolls to the mill table side frames by axially slidably inserting the bearing housings within windows of the end frames. This arrangement and method suffers from a number of drawbacks in that it is necessary to axially displace the bearing housing into nested relation with the window members, while the length of the stress carrying window side members permits the generation of considerable bending moments. In view of the stress limits thus imposed, the minimum possible spacing of adjacent rolls is greater than desired, while the method of mounting rolls and associated bearings in the end frames causes considerable complexity in portions of the mill such as the vicinity of edger feed rolls where the provision of sufficient end clearances from the table edge is difficult, and results in complications of associated structures.

The present invention provides a bearing housing mounting arrangement permitting the downward entry of a bearing housing extension foot into an open topped frame recess, the subsequent axial insertion of locking wedges maintaining the housing in positively locked engagement within the recess. In addition to the advantages afforded by direct downward access of the housing to its mounting, the form of the mounting provides short side arms of great stiffness and strength, while the center to center distance between adjacent rolls may be effectively reduced, to provide a roll table of enhanced characteristic and improved load bearing capacity.

The invention thus provides a method of mounting a roll in bearings secured to a pair of facing frame assemblies of a roll table, including the steps of axially positioning the respective bearing housings over the journals of the roll, positioning the roll and assembled housings over the table adjacent the operating position of the roll, moving the roll and the attached bearing housings towards the table to enter respective foot portions of the respective housings downwardly within a respective recess of each end frame, and interposing key means in wedging relation between adjacent thrust surfaces of each foot and the wall of the respective recess adjacent thereto in compressed foot retaining relation whereby removal of the foot from the recess under roll loading conditions is precluded.

The apparatus for carrying out the invention comprises in combination a bearing housing and bearing housing mounting means, the housing mounting means having an open recess therein, the housing having an axially extending bearing bore, a foot portion extending from the housing having transverse dimensions in a plane normal to the bore less than the corresponding transverse dimensions of the housing recess to permit free downward entry of the foot portion through the recess outer opening, at least one shoulder on the housing facing at least partially outwardly towards the recess outer opening, a shoulder in the wall of the recess adjacent to the shoulder of the foot, and axially slideable key means insertable between the shoulders in wedging relation therebetween to provide locking of the foot portion within the recess, whereby a housing may be readily entered into a recess for locking relation therein.

The following disclosed embodiment is directed to bearing housing arrangements wherein both sides of the housing foot are keyed against the sides of the recess. It will be apparent that one side of the foot may be dovetailed to the adjacent recess wall, in the form of a permanent key, necessitating the use of a side wedging arrangement on the opposite side of the foot only.

Certain embodiments of the present invention are described, reference being had to the accompanying drawings wherein.

Figure 1:
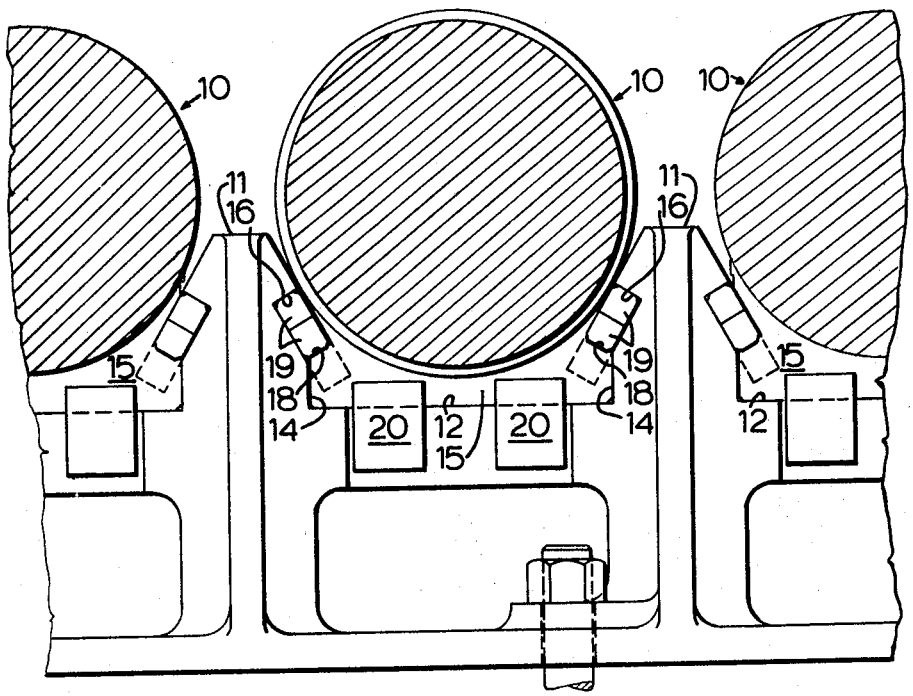
FIG. 1 shows a partial side view of three adjacent bearing housings mounted in accordance with the present invention.
Figure 3:
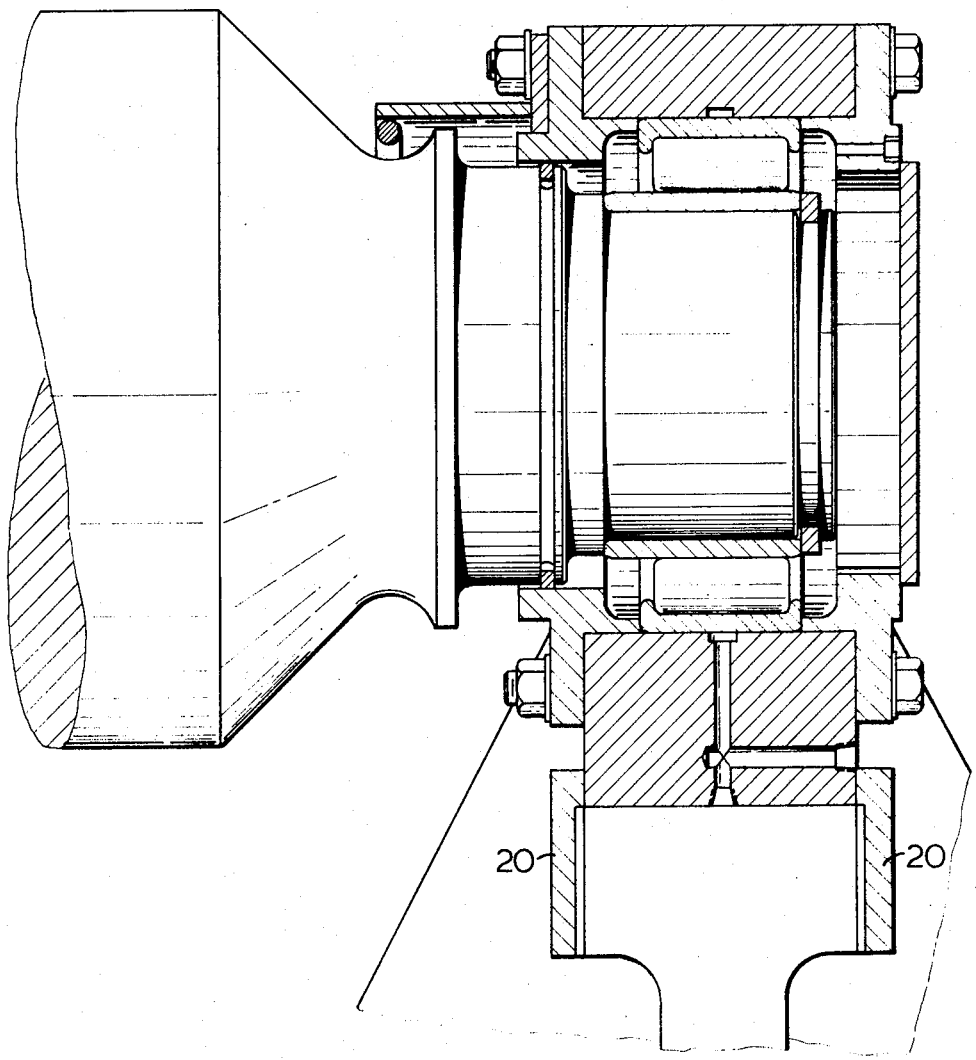
FIG. 3 is a section on the line 3—3 of FIG. 2, including a portion of a roll mounted in the bearing.

Referring to FIGS. 1 and 3 adjacent roll bearing mountings 10 and 30 are shown, the embodiments 10 being vertically symmetrical whereas the mounting embodiments 30 are canted. Each mounting includes side pedestals 11 and 31 forming recesses 12, 32 respectively into which foot portions 15, 35 extend.

Referring first to FIG. 1, it will be seen that the sides 14 formed between adjacent pedestals 11 extend vertically upwardly to receive the lower end of the respective foot 15 in close sliding relation therein. Recess shoulders 16 are laterally offset in the respective pedestals 11 to provide unimpeded vertical access for the respective foot 15 into the recess. The foot 15 is provided with an inclined keyway 18 recessed therein, the bottom of which is in opposed facing relation with the respective shoulder 16 of the pedestal 11. Split tapered keys 19, 19 forced into the composite keyways thus formed serve to ram the foot 15 into the bottom of the recess 12, and to secure the foot substantially immovable therein against overturning moments exerted on the roll bearing. End pads 20 prevent axial movement of the bearing housing feet 15 from the respective recesses 12 (see FIG. 3). The substantially vertical disposition of the sides 14 of slots 12 permits vertical entry and exit of the feet 15 of the bearing housings, with the keys 19 removed.

Figure 2:
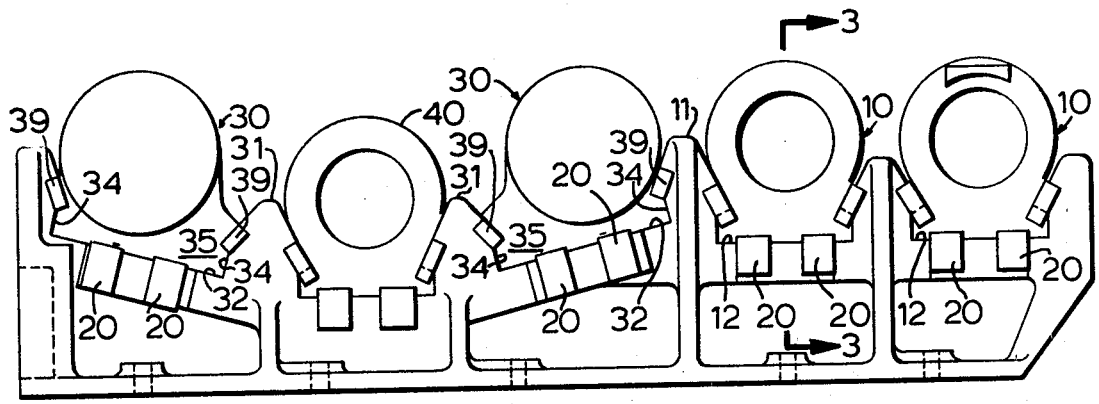
FIG. 2 is a view similar to FIG. 1 showing a series of five adjacent bearing housings.

Referring to the embodiment of FIG. 2, the mountings 30 are asymmetrical, having inclined axes defined by the shaped side walls 34. The keys 39 are correspondingly canted, the empty keyways thus permitting ready insertion and withdrawal of the respective foot portions 35 in the canted direction of the respective recesses 32.

The angle of inclination of the respective keyways is determined by the desired force components in the horizontal and vertical planes necessary to restrain the feet 15, 35 against the vertical and horizontal working load components which tend to displace the feet from their slots.

With reference to the downwardly displaced bearing housing 40, this accommodates a larger diameter table roll in the vicinity of an edger installation, not shown.

To facilitate insertion and removal of the keys 19, 39 these are provided with taper of approximately one-quarter inch per foot of length.

The adoption of tapered locking keys permits parallel machining of the keyway—defining surfaces of the bearing housing feet and the pedestal shoulders.

In addition to permitting closer spacing between adjacent table rolls, the provision of angled keys in the structure permits the selection of any desired balance between horizontal and vertical roll restraint forces.

The use of drop-in mountings to receive the feet of the bearing housings eliminates axial displacement of rolls relative to the roll table, thus permitting the location of adjacent equipment closer to the table. This, in turn, permits advantageous improvements in the design of other mill components, such as edgers, etc.

The provision of a canted bearing mounting is of particular significance in locations such as the mill edger where a straight lift by the mill crane is difficult to provide due to the edger structure located above the roll table. The subject arrangement provides enhanced serviceability and facilitates maintenance.

In accordance with the provisions of the patent statutes, I have explained the principle and operation of my invention and have illustrated and described what I consider to represent the best embodiment thereof.

I claim:

1. In combination a bearing housing and bearing housing mounting means, said housing having an axially extending bearing bore to receive an end journal of a mill roll axially inserted therein, foot portion extending downwardly from the housing, said housing mounting means having an open recess therein having transverse dimensions in a plane normal to the bore greater than the corresponding transverse dimensions of said housing foot portion to permit free downward entry of the foot portion into the recess, said recess being bounded by inwardly facing shoulders, said housing foot portion having outwardly facing shoulders, each in respective facing relation with a said recess shoulder, and key means insertable between said facing shoulders in a direction substantially parallel with said roll journal in wedging relation between said shoulders to provide locking of the foot portion within the recess, whereby the foot portion of a said housing having a roll rotatably journaled therein may be readily moved downwardly into said recess for locking relation therein.

2. The bearing housing combination as claimed in claim 1 wherein said slideable key means comprises a pair of opposed wedge portions in compressed wedging relation between said shoulders.

3. The bearing housing combination as claimed in claim 1 having a pair of said shoulders on opposite sides of said foot portion, said recess having a pair of corresponding shoulders in spaced facing relation with said housing shoulders, and two pairs of keys in axially slideable relation between said facing shoulders to provide a substantially symmetrical bearing retaining arrangement.

4. The bearing housing combination as claimed in claim 1 having a first pair of adjacent shoulders in mutual facing relation, a second pair of adjacent shoulders in mutual facing relation, said mounting recess extending at an angle inclined from the vertical to permit canted insertion and retention of said bearing housing foot portion therein.

* * * * *